United States Patent
Hoover

(10) Patent No.: US 10,055,503 B2
(45) Date of Patent: Aug. 21, 2018

(54) REFINING USER SEARCH FOR ITEMS RELATED TO OTHER ITEMS

(71) Applicant: Amazon Technologies, Inc., Reno, NV (US)

(72) Inventor: Thomas Jay Hoover, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 15/401,977

(22) Filed: Jan. 9, 2017

(65) Prior Publication Data
US 2017/0116347 A1    Apr. 27, 2017

Related U.S. Application Data

(63) Continuation of application No. 13/927,969, filed on Jun. 26, 2013, now Pat. No. 9,582,534.

(51) Int. Cl.
*G06F 17/00* (2006.01)
*G06F 17/30* (2006.01)

(52) U.S. Cl.
CPC .. *G06F 17/30867* (2013.01); *G06F 17/30876* (2013.01); *G06F 17/30973* (2013.01)

(58) Field of Classification Search
CPC ............. G06F 11/1458; G06F 11/2056; G06F 11/2071; G06F 11/2082; G06F 11/2028
See application file for complete search history.

(56) References Cited

U.S. PATENT DOCUMENTS

2014/0280292 A1* 9/2014 Skinder ............. G06F 17/30448
707/767
2015/0286643 A1* 10/2015 Kumar .............. G06F 17/30672
707/728

OTHER PUBLICATIONS

Non-Final Office Action issued in U.S. Appl. No. 13/927,969, dated Mar. 1, 2016.
Final Office Action issued in U.S. Appl. No. 13/927,969, dated Aug. 25, 2016.
Notice of Allowance issued in U.S. Appl. No. 13/927,969, dated Oct. 26, 2016.

* cited by examiner

*Primary Examiner* — Truong Vo
(74) *Attorney, Agent, or Firm* — Hogan Lovells US LLP

(57) ABSTRACT

Embodiments of methods, systems, and storage medium associated with processing a search request for items are disclosed herein. In one instance, the method may include determining that a search request includes an indication of intent to obtain information about items that are related to other items, obtaining information about a first set of items from a first data repository, including the obtained information as input in the search request, and obtaining, in response to the search request, information about a second set of items related to the items of the first set from a second data repository. The second data repository may include information about items, including relationship of the second set of items with the first set of items. The item relationship may be determined based on collaborative filtering of information associated with the first or second items. Other embodiments may be described and/or claimed.

20 Claims, 6 Drawing Sheets

REFINING USER SEARCH FOR ITEMS RELATED TO OTHER ITEMS

CROSS REFERENCE TO RELATED APPLICATION

This application is a Continuation of, and accordingly claims the benefit of, U.S. patent application Ser. No. 13/927,969 filed with the U.S. Patent and Trademark Office on Jun. 26, 2013, which is hereby incorporated herein by reference.

BACKGROUND

Many Web resources offering various content, services, products, or other items allow their users to search across their content, product, or service catalogs in order to find a desired item, compare the desired item with similar items, and make an informed decision about acquiring the desired item. However, searching for a desired item may present a fairly difficult problem as for a given user item query there may be multiple possible interpretations that may or may not be entirely accurate and may not always lead to desired search results and/or may require the user to repeatedly refine her search before the desired search result is obtained.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
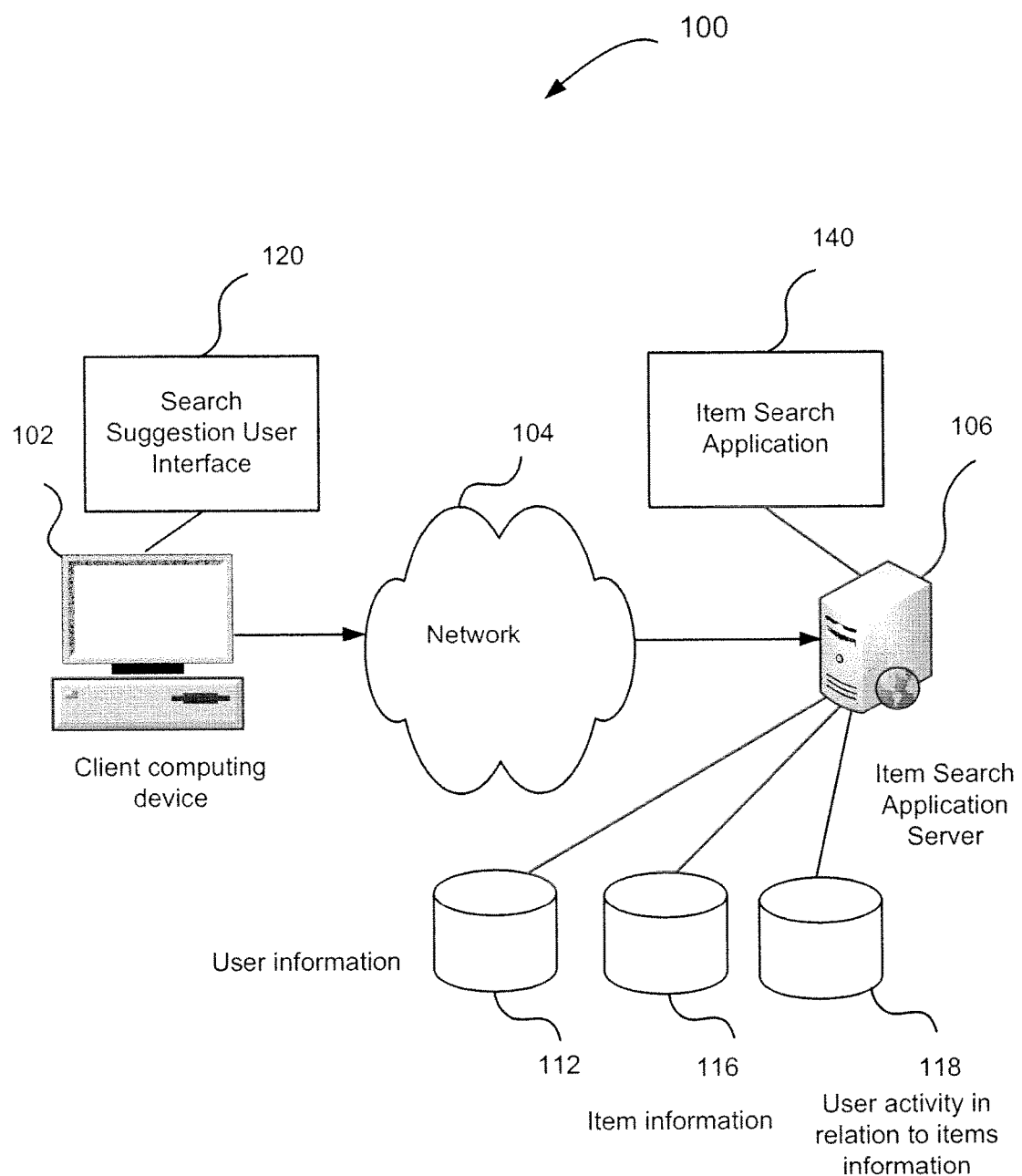
FIG. 1 is a block diagram illustrating an example computer system configured to refine user search for items that may be related to other items in accordance with various embodiments.

Techniques described herein provide for refining user search on a network resource (e.g., Web site) for items that may be related, such as similar, to other items. The items that the user may wish to use as a basis for search for related items, such as the items that may have been of prior interest to the user, may be identified, e.g., from user history information accumulated by the network resource. A search for items to which the identified items may be related may be conducted on a network resource-operated item information repository. The item information of each item stored in the item information repository (or at least some of the stored items) may include, in addition to item description, information about relationship of other items to the item whose information is stored in the item information repository. (For simplicity purposes, an item whose information is stored in the item information repository will be referred to as a "stored item"). The item relationship information may be provided via collaborative filtering analysis of the user history information accumulated by the network resource, including, for example, data about a number of users that viewed, browsed through, reviewed, or purchased a particular item, and the like.

For example, when formulating a search request for items on a network resource, a user may express intent to search for items that are related (e.g., similar) to other items. Such intent may be detected from the search request. For example, a request for "Books like books that I've read recently" may be semantically analyzed to detect intent to search for "books like [other] books." The search request with detected user intent may be decomposed into at least two sub-requests. For example, a request for "Books like books that I've read recently" may include a combination of two requests: "books like [other] books" and "[other] books that I've read recently." Accordingly, the sub-request "[other] books that I've read recently" may be executed against a data repository storing, e.g., user purchase history in order to obtain a list of books that the user purchased recently, and thus presumed read recently. As a further example, the list may further include books the user viewed or browsed leading up to the purchases.

In response to that sub-request, information about the items, such as a list of identifiers of books that the user purchased, viewed, or browsed through recently may be returned. This search request may be transformed to include the returned information as an input into the search request seeking to find "books like [other] books," where "other books" may be the ones identified as purchased, viewed, or browsed through recently by the user. The transformed search request may be executed against a data repository containing information about items (e.g., books) offered by the network resource.

The item information stored for each item in the item information repository may include information about relationship of the item to other items based on collaborative filtering analysis of user information that may be accumulated and stored by a provider of the network resource. For example, information about an item, such as a stored book may include one or more attributes (e.g., pointers) indicating relationship of other books to the stored book. In some embodiments, the relationship of other items to the stored item may include similarity of the other items to the stored item.

In some embodiments, a search suggestion user interface may be provided to a user in order to guide the user's formulation of a search request in order to conform to a type that may be semantically analyzable to detect user intent and decompose to identify sub-requests. For example, the search suggestion user interface may include prompters provided based on the verbiage inputted by the user that, when selected by the user, may put the search request in a format more recognizable by a semantics component configured to detect user intent. The search suggestion user interface may include further prompters based on item relationships identified for the user.

FIG. 1 is a block diagram illustrating an example computer system 100 configured to refine user search for items that may be related to other items, in which various embodiments described herein may be implemented. Although a Web-based computer system is used for purposes of explanation, different computer systems may be used, as appropriate, to implement various embodiments. The computer system 100 may include a computing device 102, which may be any appropriate device, such as, in some embodiments, a laptop computer, a mobile wireless device, an e-book reader, a tablet, a wearable device, among other possibilities.

The computing device 102 may be configured to receive input from a user, such as a request to search for items that may be related to other items on a network resource operated by a network resource provider. The computing device 102 may be further configured to provide the received search request to an item search application 140 executing on a server 106 operated by the network resource provider and configured to facilitate the search for items related to other items as requested by the user.

In some embodiments, the computing device 102 may be configured to receive a search request via a search suggestion user interface 120. The search suggestion user interface 120 may be provided, for example, by the item search application 140. The search suggestion user interface 120 may be configured to guide a user to enter search requests within a defined semantic space, e.g., by exposing a set of vocabulary to the user in a form of search term suggestions. The operation of the search suggestion user interface 120 will be described in greater detail in reference to FIGS. 4-5.

In some embodiments, communications between the computing device 102 and the server 106 may be conducted via a network 104. The network 104 may include any appropriate network, including an intranet, the Internet, a cellular network, a wide area, local or personal area network, portion of which is wired or wireless (e.g., Bluetooth®, near field communication (NFC), or Wi-Fi,) or any other such network or combination thereof.

The computer system 100 may further include an item search application server 106 configured to operate a user information repository 112 and an item information repository 116. The item search application server 106 may be configured to receive item search requests provided by the computing device 102, execute the item search application 140, and to provide search results received in response to the execution of the item search application 140. The item search application server 106 may be configured to communicate with a Web server (not shown) configured to facilitate communications via the network (e.g., Internet) 104. For other networks, an alternative device serving a similar purpose of facilitating communications may be used.

In some embodiments, the item search application 140 may be configured to receive a search request, determine that the request includes intent to obtain items that may be related to other items, identify one or more sub-requests in the received request, execute a first sub-request against a user information repository 112, transform the search request to include the results of the execution of the first sub-request as input in the second sub-request, and execute the transformed request against item information repository 116.

In some embodiments, the first sub-request may pertain to a search related to prior user activities on the network resource, and the second sub-request may pertain to a search for items related to the items found as a result of the execution of the first sub-request. The item search application 140 may include one or more modules that may include software and/or hardware components configured to perform the operations described herein. The operation of the item search application 140 is described in greater detail in reference to FIG. 2.

In some embodiments, the user information repository 112 may include information related to user activity on the network resource, such as, for example, user viewing and purchase history, user preferences, and the like. The item information repository 116 may be configured to include item information and further include item relationship information. For example, the item information repository 116 may be extended to include information about relationship of items to other items based on collaborative filtering analysis of user information relating to user activity in relation to the items offered (e.g., for viewing and/or purchase) by the network resource. That information may be accumulated and stored by a provider of the network resource, e.g., at the user information repository 112. In some embodiments, the information about user activity in relation to the items offered (e.g., for viewing and/or purchase) by the network resource and used for collaborative filtering analysis may be stored in a separate data repository 118.

In some embodiments, the collaborative filtering analysis may include predicting the interests of a user (e.g., in relation to a particular item) by collecting preferences or taste information from many users in relation to that item). The provision of the item information repository 116 with the item relationship information is described in greater detail in reference to FIG. 3.

Figure 2:
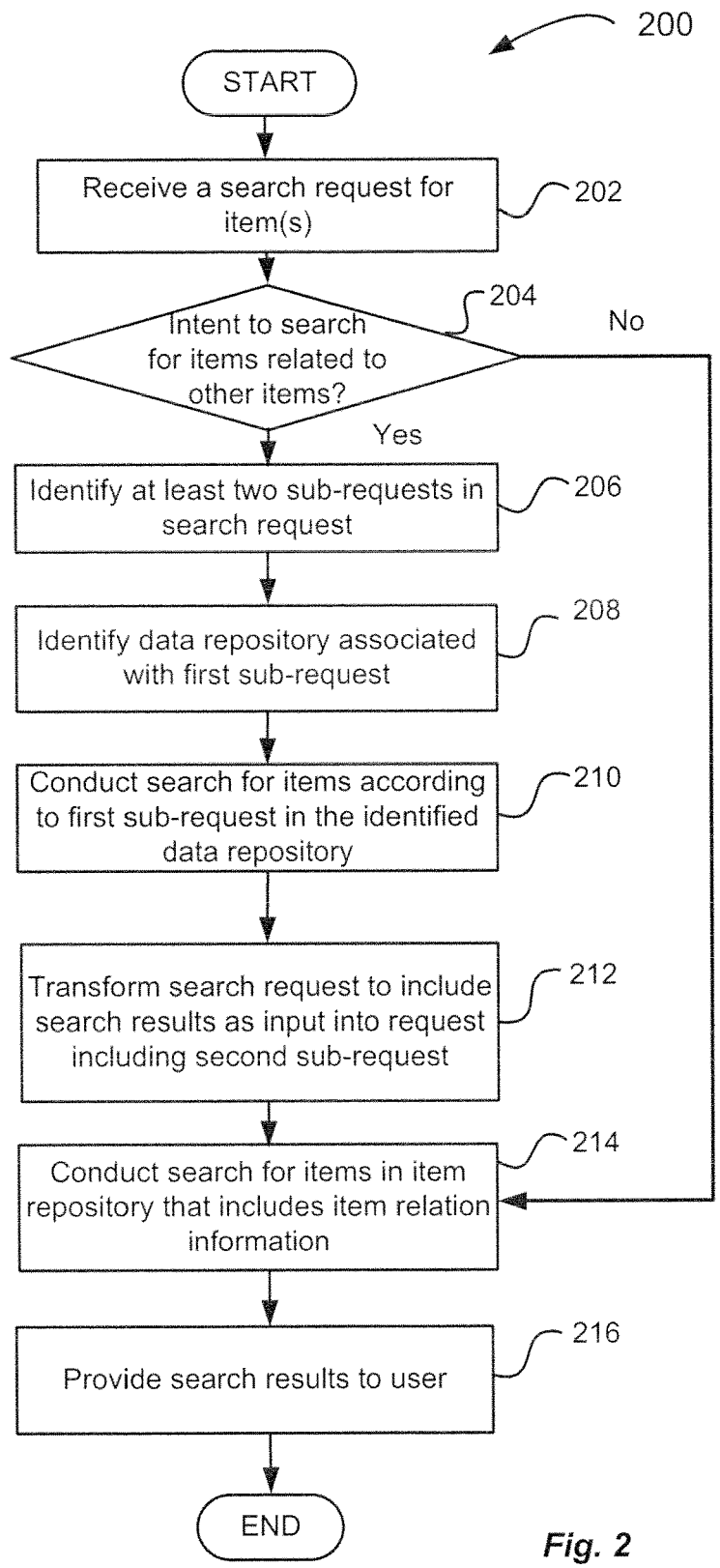
FIG. 2 is a process flow diagram illustrating a process for refining user search for items that may be related to other items, in accordance with various embodiments.

FIG. 2 is a process flow diagram illustrating a process 200 for refining user search on a network resource for items that may be related to other items, in accordance with various embodiments. The process 200 may be performed, for example, by the item search application 140 executing on the item search application server 106 as described in reference to FIG. 1.

The process 200 may begin at block 202, where the item search application 140 may obtain a search request for items generated on a computing device 102 via the interface 120 and communicated via the network 104. For example, a search request may comprise a sentence like "Books like books I read in the last month," "Bands similar to bands I like," and the like. In some embodiments, the search suggestion user interface 120 may be configured to prompt the user to enter her request in a particular format that may be semantically analyzable by the item search application 140.

At decision block 204, the item search application 140 may determine whether the search request includes intent to search for items that are related to other items. In some embodiments, the intent may be determined by semantically analyzing the search request that may be input by the user. In order to be semantically analyzable, the search request may include words or terms as a set of vocabulary of a particular semantic space. That semantic space may be defined, for example, by the search request term options that reside within the semantic space and may be provided by the search suggestion user interface as described below in reference to FIGS. 3 and 4.

Different semantic techniques may be employed in order to understand user intent and the contextual meaning of terms as they appear in the search request. In some embodiments, word-sense disambiguation (WSD) may be used to determine user intent. In some embodiments, context-free grammar, parsing expression grammar or other types of analytic formal grammar may be used to determine user intent. For example, user intent may be determined by detecting words like "similar," "like," and so forth in combination with other search terms. If no intent has been determined, the item search application 140 may proceed to conduct search for items in accordance with the request, as indicated at block 214.

If intent has been determined from the semantic analysis of the search request, at block 206 the item search application 140 may identify at least two sub-requests in the search request. For example, if the search request includes a phrase "Books like books I read in the last month," the item search application 140 may determine that the search request includes two sub-requests: "books like [other] books" and "books I read in the last month." Similarly, if the search request includes a phrase "Bands similar to bands I like," the search request may be found to include two sub-requests: "bands similar to [other] bands" and "bands I like." The sub-request identification may be conducted using a semantic analysis, for example.

As a result of such sub-request identification, at least one sub-request may be identified as pertaining to user's activities on the network resource. More specifically, a sub-request (hereinafter "first sub-request") may be identified that may pertain to user item purchase, browse, and/or viewing history. For example, the sub-requests "books I read in the last month" or "bands I like" may be identified as pertaining to user book or music purchase and/or viewing history on the network resource for the last month. Based on the identified ("first") sub-request, search criteria may be specified for searching according to the sub-request. For example, for the sub-request "books I read in the last month" the search criteria may be identified to filter item purchase and/or viewing history to books that were viewed, browsed, reviewed, and/or purchased by the particular user, over the time period dating back a month from the date of the submission of the search request described in reference to block 202.

A second sub-request may be identified as pertaining to a search for items related to other items. In the above example of the search request being "Books like books I read in the last month," the second sub-request may be identified as "books like [other] hooks." Similarly, for the search request "Bands similar to bands I like," the second sub-request may be identified as "bands similar to [other] bands."

At decision block 208, the item search application 140 may identify a data repository associated with the first sub-request (e.g., searchable by the first sub-request). In other words, the data repository may be identified that may be searchable by a sub-request to search for items that may be associated with a user via previous activity of the user on the network resource.

In some embodiments, a network resource provider may accumulate over a period of time information associated with particular users, such as user purchase history, user viewing history, user search history, user preferences, and the like. This information may be categorized (e.g., into user viewing history, user purchase history, user reviews, and the like) and stored in one or more data repositories. For example, user item purchase and/or viewing history may be stored in a data repository comprising purchase history of items offered by the network resource by multiple users of the network resource, e.g., "user information repository." Accordingly, if the item search application 140 identifies a first sub-request that may pertain to the user purchase, viewing, or browsing history, the item search application 140 may execute the first sub-request against the user information repository. For example, if the first sub-request includes an expression like "books I read in the last month," the item search application may determine that user information repository may include pertinent information, such as books viewed and/or purchased by the user during the last month, and accordingly execute the first sub-request against the user information repository.

In some embodiments, user information may be cached, in order to be accessible for querying, according to a first sub-request as described above. User information caching may be done in order to avoid potential latency when querying in real- or near-real time, in order to respond to the search request provided as described in reference to block 202.

At block 210, the item search application 140 may execute the noted first sub-request against the identified data repository (e.g., user information repository). In response, a list of items searchable by the first sub-request may be returned. Following the above example, a list of books a list of book identifiers) may be returned in response to a sub-request "books I read in the last month" executed against the user information repository. Similarly, a list of music content (e.g., content identifiers) may be returned in response to the sub-request "bands I like."

At block 212, a search request may be transformed to include the search results received in response to searching the user information repository in the original search request, e.g., as input in the second sub-request. For example, a list of book identifiers received in response to the first sub-request "books I read in the last month" may be included as input (i.e., "other books") into the second sub-request "books like [other] books" of the search request "Books like books I read in the last month."

In some embodiments, the search request including the first and second sub-requests may be expressed in a form of a search query using an s-expression format, consistent with a speech synthesis markup language (e.g., Extensible Markup Language or XML) that may be used to annotate text for speech synthesis, such as SABLE®. For example, a search request for "Books like books I read in the last month" may be transformed to include the results returned in response to the first query as follows:

(and (vtp user_viewing_results_month) (bn literature)), where "and" is an operator, "vtp user_viewing_results_month" is an argument indicating results (e.g., books) that user viewed to purchase in the last month, and "bn literature" is an argument indicating browsing a literature index of an item repository. The search query may be transformed in one or more stages, for example, the above s-expression may be transformed to include identifiers of the books that the user viewed to purchase (returned in response to the first sub-request):

(and (vtp 0140481346 0811214044 0802130917) (bn literature)), where "0140481346," "0811214044," and "0802130917" are book identifiers of the books that the user viewed to purchase in the last month.

After completing all transformation stages, at block 214, the query may be executed against an item repository configured to store information about the items, such as a search index. The querying process may include a conversion of the s-expression described above into an enterprise search platform query, such as Solr®, Apache Lucene®, or the like in order to enable the query to be executable against the item repository (more specifically, against a search index associated with the item repository and described in greater detail in reference to FIG. 3). At block 216, the search results may be provided to the user.

The item repository, against which the query described in reference to block 214 may be executed, may be extended to include information about relationships of items to other items, based in part on collaborative filtering analysis of the user activities in relation to the items that may be accumulated by the network resource provider over time. For example, information about a particular item stored in the item repository may include information (e.g., pointers) about items similar to that particular item. The item repository configuration will be described in greater detail in reference to FIG. 3.

In summary, the search results provided to the user at block 216 may include information requested by the user, namely information about the items related to other items. Following the example of the search request for "Books like books I read in the last month," the search results may include books identified as similar to books the user read in the last month as returned by the first sub-request "books I read in the last month," based, e.g., on the pointers associated with the books the user read in the last month that may be included in the information about one or more books stored in the item repository.

Figure 3:
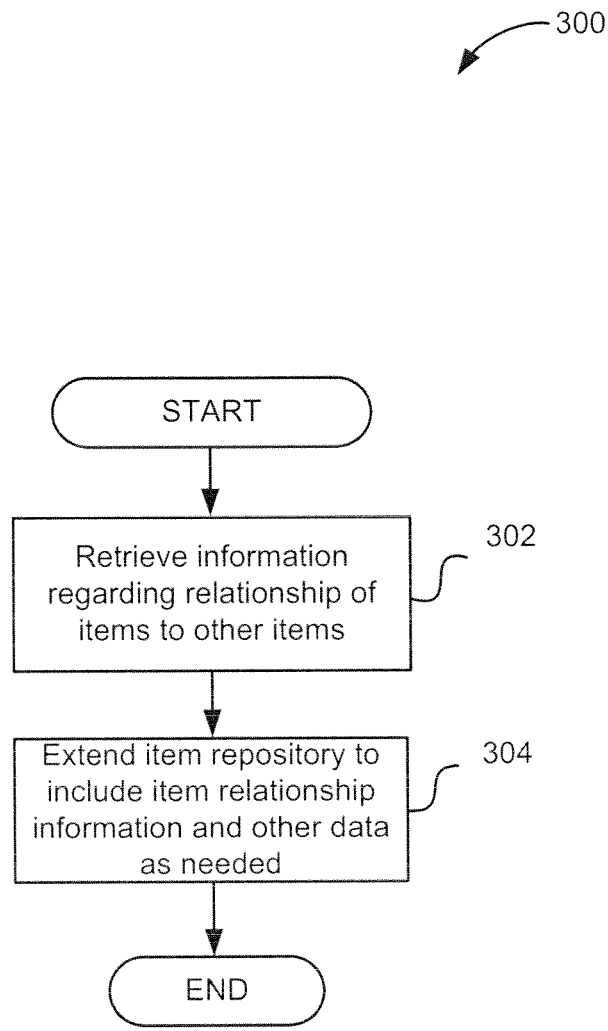
FIG. 3 is a process flow diagram illustrating a process for extending item repository with item relationship information, in accordance with various embodiments.

FIG. 3 is a process flow diagram illustrating a process 300 for extending an item repository to include information of items related to other items, in accordance with some embodiments. The process 300 may be performed, for example, by the item search application 140 executing on the item search application server 106 as described in reference to FIG. 1.

The process 300 may begin at block 302, where information about relationship of items to other items may be collected and analyzed. More specifically, information about item relationship may include information about relationship of items to other items based on collaborative filtering information that may be accumulated and stored by a provider of the network resource. One or more collaborative filtering algorithms may be used to generate attributes indicative of item relationship (e.g., similarities) to other items. These relationship attributes may be generated by analyzing, for example, using collaborative filtering techniques, item purchase history, item viewing history, user preferences, user behavior, and other user-related information that may be accumulated and stored by the network resource provider, for example, in the data repository 118 as described in reference to FIG. 1.

At block 304, the item repository storing item information may be extended to include item relationship information and other item-related data as needed. For example, information about an item, such as a book may include general attributes associated with the item: a book title, a book description, author's name, and the like. This information may be extended to include one or more attributes indicating relationship of other books to the stored book. For example, the relationship attributes may include pointers from other books stored in the repository that may be similar to the stored book. The relationship attributes may further include score values indicative of a level of similarity of each other hook to the stored book.

Based on the item information including item relationship information, a searchable document corresponding with every item or other searchable entity in the item repository may be generated. In some embodiment, the searchable document may include a reverse search index (e.g., Apache Lucene® index) corresponding to the item repository. The relationship attributes may be provided in additional fields of the searchable document that pertain to a particular item, in addition to the fields including general attributes (e.g., item title, item description, and the like).

Accordingly, a search query generated by the search request for items related to other items as described in reference to FIG. 2 may be executed (e.g., in real- or near-real time) against the item repository (more specifically, against the reverse search index corresponding to the item repository). Based on a search of the reverse search index extended as described herein, the search results returned as a result of the query execution may include information of items related to (e.g., similar to) other items, as requested in the search request.

A search request may be entered by a user in a free form. However, understanding and semantically analyzing free-form user queries in order to detect user intent may prove to be a challenging task. Accordingly, in some embodiments, a search suggestion user interface may be configured that may guide the user to enter search requests that may conform to the semantically analyzable verbiage. In other words, the search suggestion user interface may be configured to guide a user to enter search requests within a defined semantic space, e.g., by exposing a limited vocabulary to the user in a form of search term suggestions. The search request composed using the search suggestion interface may be analyzed in order to detect user intent, decompose the search request into sub-requests, and provide the user search refinement as described in reference to FIGS. 1-3.

Figure 4:
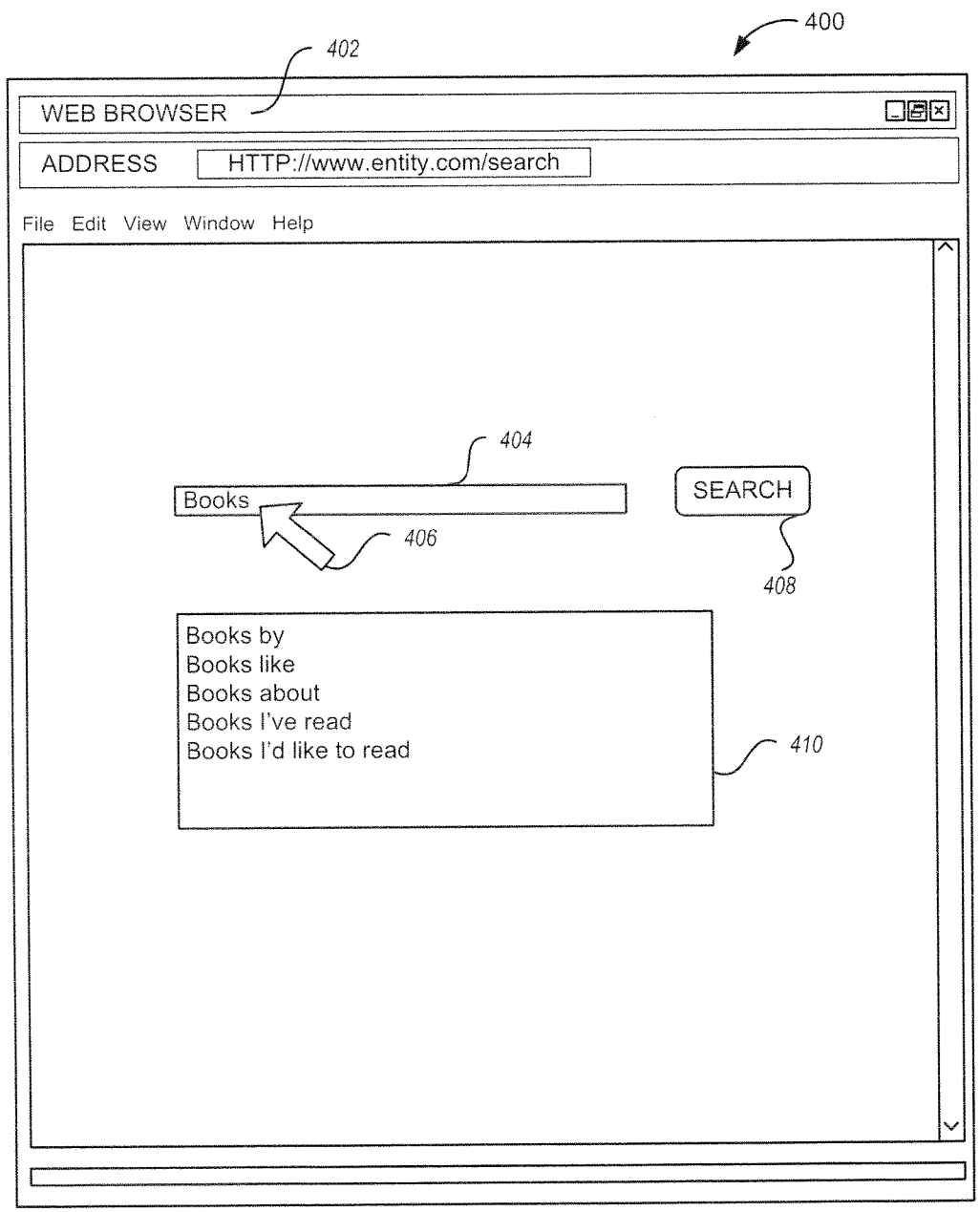
FIG. 4 is a screenshot of an example search suggestion user interface, in accordance with various embodiments.
Figure 5:
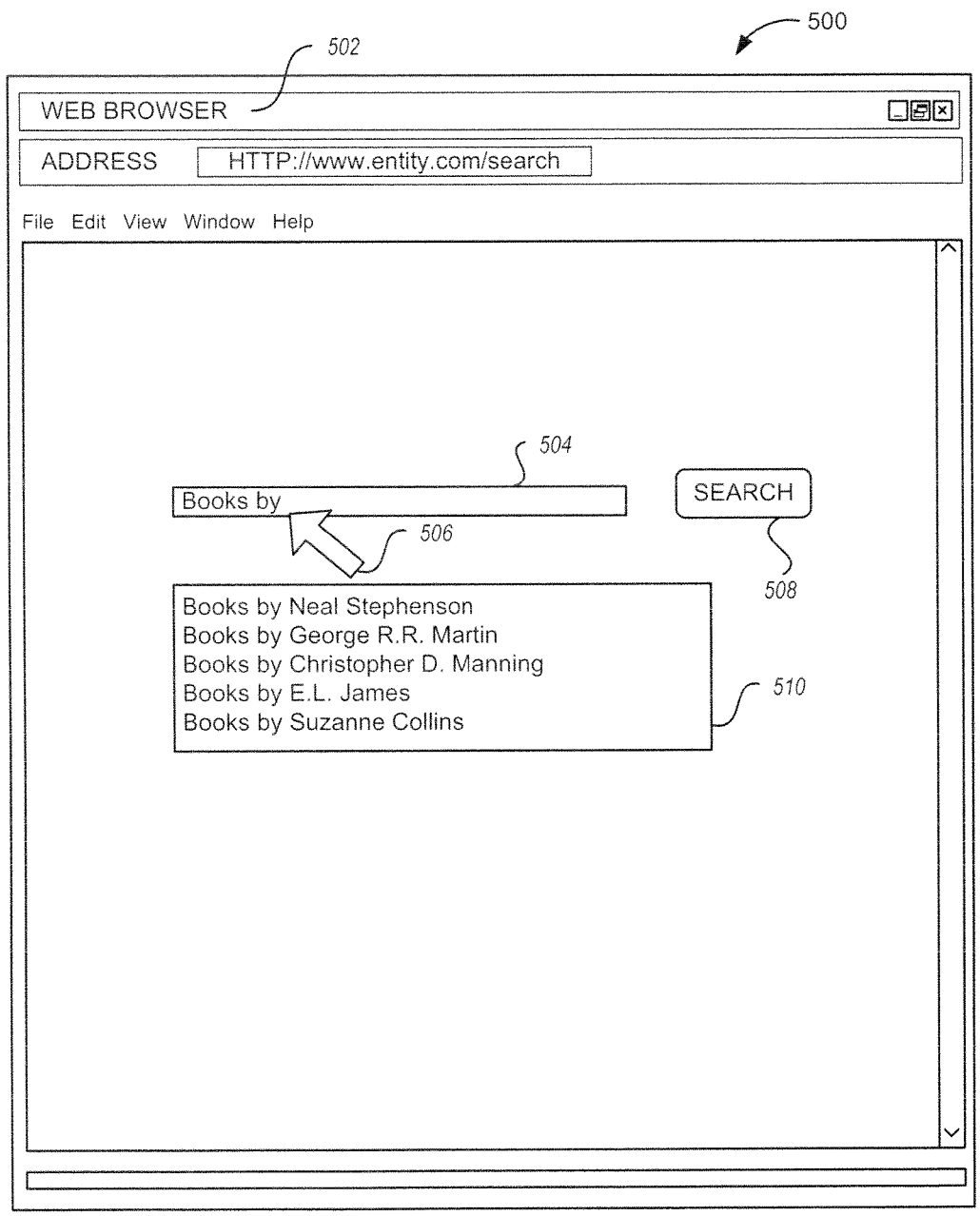
FIG. 5 is a screenshot of another example search suggestion user interface process for, in accordance with various embodiments.

FIGS. 4 and 5 illustrate screenshots of example search suggestion user interfaces 400 and 500, in accordance with some embodiments. In some embodiments, the user interfaces 400 and 500 may be provided by the item search application 140 executing on the server 106. The search suggestion user interfaces illustrated in FIGS. 4 and 5 should be interpreted as in no way limiting and are shown for illustrative purposes only. It is to be understood that FIGS. 4 and 5 illustrate but some examples of the search suggestion user interface implementations that may be provided by the item search application 140. Those skilled in the art will appreciate that different versions of the interface may be implemented.

It will be also appreciated that the example search suggestion user interface 400 (500) may illustrate some portions of a user interface that may be pertinent to the present disclosure. Different user interface elements, icons, buttons, drop-down menus, and other user interface components may be included in the user interface and configured to provide the functionalities associated with the search for items on a network resource via the item search application 140. Some user interface elements (e.g., windows, icons, buttons, and the like) may be configured to be selectable by the user. It will be appreciated that other user interface elements may be added to the search suggestion user interface 400 (500) or removed therefrom in order to implement the techniques described herein, as needed. At least some of these user interface elements are omitted from the present disclosure for simplicity purposes.

Referring to FIGS. 4 and 5, the search suggestion user interface 400 (500) may be displayed on a display screen (not shown) of a computing device, such as computing device 102. The search suggestion user interface 400 (500) may include a browser 402 (502) through which a user may access any communication and/or item search service provided, for example, by the network resource as described in reference to FIGS. 1-3. In some embodiments, the search suggestion user interface 400 (500) may include a window 404 (504) in any known form (e.g., a drop-down menu, a selection box, or a space). The window 404 (504) may enable the user to enter or otherwise input a search request for items. The search request may be entered using, for example, a cursor 406 (506) or other user interface component configured with similar functions (e.g., a stylus, a touch if the user interface provided on a touch screen, or any other known method).

The search suggestion user interface 400 (500) may further include a "Search" button 408 (508) enabling a user to submit her search request to the item search application 140, once the search request is input in the window 404 (504). The search suggestion user interface 400 (500) may further include a window 410 (510) configured to display search suggestions in response to user entering one or more search terms.

As briefly described above, the search suggestion user interface 400 (500) may be configured to guide a user by exposing a limited vocabulary to the user in a form of search term suggestions within a particular semantic space. In some embodiments, context-free-grammar (CFG) may be used to translate natural text queries from the users into s-expressions. This may allow the user to enter, via the search suggestion user interface, structured queries in English or other supported languages that may follow the query format as described in reference to FIG. 2. The examples of using the search suggestion user interface to guide the user to formulate a search request that may be semantically analyzable are considered below.

Referring to FIG. 4, assume a user enters the word "Books" in the window 404, as shown. If this word belongs to a vocabulary that may be recognized, e.g., by the item search application 140, the search suggestion user interface may be configured to provide suggestions also belonging to the limited vocabulary recognizable by the item search application 140, in order to provide a semantically analyzable search request. Accordingly, the suggestions may be proposed and displayed to the user in the window 410, namely "books by," "books like," "books about," "books I've read," "hooks I'd like to read," or other suggestions related to the word "books" and belonging to the limited vocabulary that may be used to have the search requests conform to the recognizable (e.g., semantically analyzable) search format.

Referring to FIG. 5, assume the user selects one of the proposed suggestions, "books by," and enters the selected suggestion (or selects the suggestion to be entered) in the window 504. Accordingly, the search suggestion user interface may suggest parameters for further refinement of the user's search by using the user's preferred authors, similarities of other authors to the user's preferred authors, site-wide favorites, and the like. In some embodiments, the user's preferred authors may be retrieved from the user history stored in a separate data repository, as discussed in reference to FIG. 1. The retrieval of user-related information may be triggered, for example, by recognizing an entry in the window 504, such as "books by," and querying the user history repository to retrieve the authors associated with the user's prior activity on the network resource.

Figure 6:
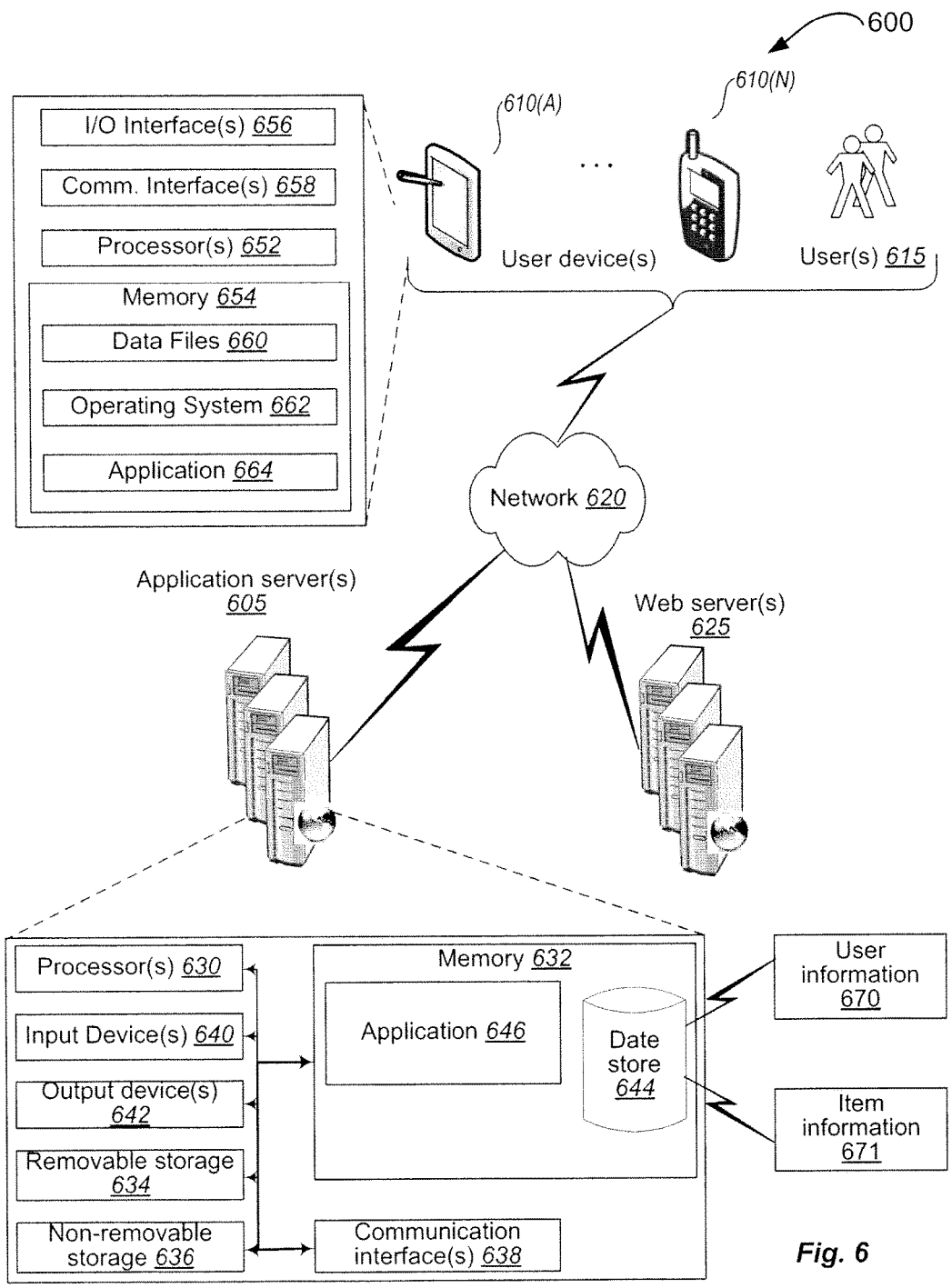
FIG. 6 illustrates an exam computing environment which embodiments described in the present disclosure may be implemented.

FIG. 6 illustrates an example of an illustrative computing environment 600 for implementing aspects in accordance with various embodiments described herein. As will be appreciated, although a Web-based environment is used for purposes of explanation, different environments may be used, as appropriate, to implement various embodiments. The illustrative computing environment 600 may include one or more electronic computing devices 610(A)-610(N), which may include any appropriate device operable to send and receive requests, messages, or information over an appropriate network 620 and convey information back to a user 615 of the device, such as the computing device 102 described in greater detail in reference to FIG. 1. Examples of such computing devices may include personal computers, smartphones, cell phones, handheld messaging devices, laptop computers, set-top boxes, personal data assistants, electronic book readers, tablets computers, and the like.

The computing devices 610(A)-610(N) may include a processor 652 and memory 654 for storing processor-executable instructions, such as data files 660, operating system 662, and one or more applications 664, such as item search application 140 described in reference to FIG. 1. The operating system 662 may be a general purpose operating system such as a Microsoft Windows® operating system, a UNIX® operating system, a Linux® operating system, or an operating system specifically written for and tailored to the computing devices 610(A)-610(N).

The computing devices 610(A)-610(N) may further include at least one or both of the following elements: input/output interface 656 and communication interface 658. The communication interface 658 may enable the computing devices 610(A)-610(N) to communicate data, control signals, data requests, and other information with other resources including computers, data sources, storage devices, and the like, on the appropriate computer network 620 such as the Internet, via wired or wireless connections. The input/output interface 656 may enable the computing devices 610(A)-610(N) to obtain data input from a variety of devices including, but not limited to, a digital pen, a touch screen, a keyboard, a mouse, a scanner, and the like. In addition to the illustrative components described above, a display interface (not shown) may be used for outputting display information to a computer user 615. Typically, the display information may be outputted by the display interface via a display device (e.g., a CRT monitor, an LCD screen, a touch screen, a television, an integrated screen or sets of screens, etc.).

The network 620 may include any appropriate network, including an intranet, the Internet, a cellular network, a local area network, a personal network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

The memory 654 may generally comprise RAM, ROM, and/or other permanent memory. Thus, in addition to storage in read/write memory (RAM), programming instructions may also be embodied in read-only format, such as those found in ROM or other permanent memory.

The illustrative computing environment 600 may include at least one application server 605 including, or associated with, one or more processors 630, input devices 640, output devices 642, removable storage 634, and non-removable storage 636 that may be connected to a communication interface 638 and memory 632. The memory 632 may include, but is not limited to, application 646 similar to the item search application 140 described above in reference to FIG. 1.

The memory 632 may further include a data store 644 configured to store user information 670 and item information 671 as described above in reference to the data repositories 112 and 116 of FIG. 1. As used herein, the term "data store" may refer to any device or combination of devices capable of storing, accessing, and retrieving data, which may include any combination and number of data servers, databases, data storage devices, and data storage media, in any standard, distributed, or clustered environment. It should be understood that there may be many other aspects that may need to be stored in the memory 632, such as user access right information, which may be stored in any of the above-listed mechanisms as appropriate.

The application server 605 may include any appropriate hardware and software for integrating with the data store 644 as needed to execute aspects of one or more applications for the computing devices 610(A)-610(N), handling a majority of the data access and business logic for an application. The application server 605 may provide access control services in cooperation with the data store 644, and is able to generate content such as text, graphics, audio, and/or video to be transferred to a viewer, which may be served to the viewer by the Web server in the form of HTML, XML, or another appropriate structured language in this example. The handling of all requests and responses, (e.g., requests for item information and the information provided in response) as well as the delivery of content between the computing devices 610(A)-610(N) and the application server 605 may be handled by the content provider Web server(s) 625.

It should be understood that the Web and application servers 605 and 625 are not required and are merely example components, as the applications and software components discussed herein may be executed on any appropriate device or host machine as described elsewhere herein. Each server 605 or 625 may include an operating system that may provide executable program instructions for the general administration and operation of that server, and may include a computer-readable medium storing instructions that, when executed by a processor (e.g., 630) of the server, may allow the server to perform its intended functions. Suitable implementations for the operating system and general functionality of the servers are known or commercially available, and are readily implemented by persons having ordinary skill in the art, particularly in light of the disclosure herein.

The illustrative computing environment 600 may include a distributed computing environment utilizing several computer systems and components that may be interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the illustrative computing environment 600 in FIG. 6 should be taken as being illustrative in nature, and not limited to the scope of the disclosure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method, comprising:
    receiving a search request for first content, the search request including an indication of intent to obtain one or more items offered through an electronic marketplace searchable by a sub-request;
    determining a sub-request based at least in part on the indication of intent;
    executing the search request against a first data repository to obtain information associated with a first set of items;
    using the information in the sub-request to query a second data repository;
    obtaining a second set of items in response to the sub-request, individual items in the second set of items related to at least one item of the first set of items and associated with collaborative filtering information, the collaborative filtering information describing associations between items of a plurality of items; and
    analyzing the collaborative filtering information to determine the associations between individual items in the second set of items and at least one item of the plurality of items.

2. The computer-implemented method of claim 1, wherein data indicative of the association of the second set of items to the at least one item of a plurality of items includes indications of similarity of the second set of items to the at least one item.

3. The computer-implemented method of claim 1, wherein the information about the first set of items includes item identifiers of the items.

4. The computer-implemented method of claim 1, wherein the first set of items includes items purchased by a user over a time period, wherein the second data repository includes a reverse search index of the items.

5. The computer-implemented method of claim 1, wherein at least one of the search request or the sub-request is provided in a form of an s-expression.

6. The computer-implemented method of claim 1, wherein the first data repository includes user purchase, viewing, or browse history information and wherein the first set of items includes items purchased, viewed, or browsed by a user.

7. The computer-implemented method of claim 1, wherein determining that a search request for items includes the indication of intent to obtain information about items that are related to other items is based at least in part on semantic analysis of the search request, the semantic analysis including at least one of: context-free grammar, parsing expression grammar, or word-sense disambiguation.

8. The computer-implemented method of claim 1, further comprising: providing, a search suggestion user interface, the search suggestion user interface configured with a context-free grammar to provide suggestions for search term refinements, based in part on a search term included into the search request.

9. The computer-implemented method of claim 8, further comprising: obtaining, the search request, wherein the search request is provided via the search suggestion user interface.

10. The computer-implemented method of claim 1, wherein the second data repository includes a reverse search index that is extended to include data that is indicative of a relationship of one or more items to at least one item.

11. A computer system for processing requests for records, the computer system comprising:
    at least one processor; and
    at least one memory having processor-executable instructions that, in response to execution by the at least one processor, cause the computer system to:
       receive a search request for first content, the search request including an indication of intent to obtain one or more items offered through an electronic marketplace searchable by a sub-request;
       determine a sub-request based at least in part on the indication of intent;

execute the search request against a first data repository to obtain information associated with a first set of items; and use the information in the sub-request to query a second data repository;

obtain a second set of items in response to the sub-request, individual items in the second set of items related to at least one item of the first set of items and associated with collaborative filtering information, the collaborative filtering information describing associations between items of a plurality of items; and analyze the collaborative filtering information to determine the associations between individual items in the second set of items and at least one item of the plurality of items.

12. The computer system of claim 11, wherein the processor-executable instructions further cause the computer system, in response to execution on the processor, to extend the second data repository to include, at least for some items, data indicative of the association of the second set of items to the at least one item of a plurality of items.

13. The computer system of claim 12, wherein the data includes indications of similarity of the second set of items to the first set of items.

14. The computer system of claim 11, wherein the collaborative filtering information associated with the first or second set of items is provided based at least in part on information about user activity in relation to the first or second set of items.

15. The computer system of claim 11, wherein the first data repository includes user purchase, viewing, or browsing history information and wherein the first set of items includes items purchased, viewed, or browsed by a user.

16. The computer system of claim 11, wherein the second item repository includes a reverse search index of the second set of items.

17. A non-transitory computing device-readable medium comprising computing device-executable instructions for processing a search request for items, wherein the instructions, in response to execution by a computing device, cause the computing device to:

receive a search request for first content, the search request including an indication of intent to obtain one or more items offered through an electronic marketplace searchable by a sub-request;

determine a sub-request based at least in part on the indication of intent;

execute the search request against a first data repository to obtain information associated with a first set of items; and use the information in the sub-request to query a second data repository;

obtain a second set of items in response to the sub-request, individual items in the second set of items related to at least one item of the first set of items and associated with collaborative filtering information, the collaborative filtering information describing associations between items of a plurality of items; and analyze the collaborative filtering information to determine the associations between individual items in the second set of items and at least one item of the plurality of items.

18. The non-transitory computing device-readable medium of claim 17, wherein a determination of the indication of intent to obtain information about items that are related to other items is based at least in part on semantic analysis of the search request.

19. The non-transitory computing device-readable medium of claim 17, wherein the computing device-executable instructions further cause the computing device, in response to execution, to extend the second item repository to include, at least for some items, data indicative of the association of the second set of items to the at least one item of a plurality of items.

20. The non-transitory computing device-readable medium of claim 17, wherein the computing device-executable instructions further cause the computing device, in response to execution, to identify the first data repository based at least in part on the search request, wherein the first data repository includes user purchase, viewing, and browse history information.

\* \* \* \* \*